United States Patent Office 3,240,809
Patented Mar. 15, 1966

3,240,809
4-AMINO-1-PHENYL-1-[2-(HYDROXYALKYL)
PHENYL] BUTAN-(1)-OLS
Torkil O. Holm, Copenhagen, Denmark, assignor to
Kefalas A/S, Copenhagen-Valby, Denmark
No Drawing. Original application Feb. 2, 1962, Ser. No.
172,775. Divided and this application Aug. 27, 1964,
Ser. No. 392,622
Claims priority, application Great Britain, Feb. 17, 1961,
5,893/61
2 Claims. (Cl. 260—570)

This application is a division of application Serial No. 172,775, filed February 2, 1962.

The present invention relates to 9,10-dihydroanthracenes of the general formula:

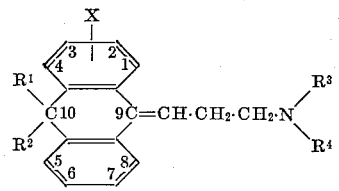

wherein X represents hydrogen or halogen, $R^1$ and $R^2$ each represents a lower-alkyl group, and $R^3$ and $R^4$ each represents a lower-alkyl group of $R^3$ and $R^4$ taken together with the nitrogen atom represent the radical of a saturated five-membered or six-membered heterocyclic amine, as well as acid addition salts thereof.

The compounds of Formula I and the corresponding acid addition salts are valuable therapeutics and possess valuable pharmacodynamic properties. In animal experiments the compounds show sedative effects. They further exhibit a mydriatic and anticholinergic effect and potentiates the effect of adrenaline, noradrenaline and barbiturates. In addition some of the compounds of Formula I show local anesthetic effects. In clinical trials the compounds of Formula I, and especially 9-gamma-dimethylaminopropylidene - 10,10 - dimethyl - 9,10 - dihydroanthracene, have been found effective in the treatment of psychotic patients, for example patients suffering from depressions.

When in the compounds of Formula I X is halogen they may exist as two geometric isomers of the cis-trans type, differing widely with respect to their pharmacodynamic properties.

The invention moreover relates to a method for the preparation of compounds of Formula I, whereby a compound of the formula:

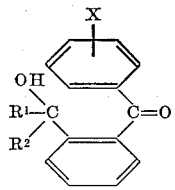

wherein $R^1$, $R^2$ and X are as defined above, is subjected to a Grignard reaction with a Grignard compound of the formula:

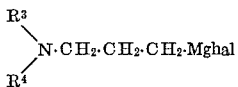

wherein $R^3$ and $R^4$ are as defined above and hal represents a halogen atom, and the magnesium complex obtained hydrolyzed, whereupon the resulting compound of the formula:

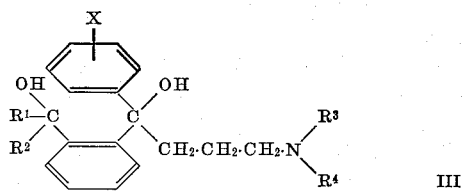

is dehydrated, and the resulting compound of the Formula I isolated as the free base or in the form of an acid addition salt thereof and, in the event said compound of Formula I or said addition salt thereof is a mixture of geometric isomers, the individual isomers thereof are isolated, if desired, by procedure already known for the separation and isolation of such isomers.

The Grignard reaction according to the invention may conveniently be carried out in an inert solvent such as diethyl-ether, tetrahydrofuran, or the like, and the hydrolysis of the resulting magnesium complex may conveniently be effected by adding a dilute mineral acid such as dilute hydrochloric acid to the reaction mixture.

The dehydration according to the invention may be effected by means of strong dehydrating agents such as strong acids, and it has been found very convenient to carry out said dehydration by reacting the compound of Formula III which is hitherto unknown with concentrated sulphuric acid, preferably at temperatures between zero degrees centigrade and about 100 degrees centigrade.

When isolating the compounds of Formula I in the form of an acid addition salt, the acid is preferably selected so as to contain an anion which is non-toxic and pharmacologically acceptable, at least in usual therapeutic doses. Representative salts which are included in this preferred group are the hydrochlorides, hydrobromides, sulphates, acetates, phosphates, nitrates, methanesulphonates, ethanesulphonates, lactates, citrates, tartrates or bitartrates, and maleates of the amines of Formula I. Other acids are likewise suitable and may be employed if desired. For example, fumaric, benzoic, ascorbic, succinic, salicylic, bismethylenesalicylic, propionic, gluconic, malic, malonic, mandelic, cinnamic, citraconic, stearic, palmitic, itaconic, glycolic, benzenesulphonic, and sulphamic acids may also be employed as acid addition salt-forming acids.

In the foregoing Formula I and elsewhere herein, the term lower-alkyl refers to alkyl radicals containing up to and including eight carbon atoms, and preferably no more than three carbon atoms. The radicals may have either straight or branched chain structure. Typical examples are methyl, ethyl, propyl, isopropyl, butyl, isobutyl, amyl, hexyl, heptyl, octyl, or the like.

As representative examples of radicals in which $R^3$ and $R^4$ together with the nitrogen atom in Formula I represent a saturated five-membered or six-membered heterocyclic amine radical may be mentioned the pyrrolidine, piperidine, morpholine, thiamorpholine, $N^1$-lower-alkylpiperazine, and like radicals.

The starting compounds of Formula II are preferably such compounds wherein X is hydrogen and in the Grignard compounds R³ and R⁴ are preferably methyl groups, not only from the standpoint of availability of these starting materials, but also from the standpoint of ease of operation and smoothness of reaction.

The compounds of Formula I and the corresponding acid addition salts may be administered both orally and parenterally, and may be used for example in the form of tablets, capsules, powders, syrups or solutions for injection.

Most conveniently the compounds of Formula I are administered orally in unit dosage form such as tablets or capsules, each dosage unit containing a non-toxic acid addition salt of one of the said compounds in an amount of from 5 to 100 mg. calculated as the free amine, the total daily dosage usually ranging from about 15 mg. to 1500 mg.

When preparing tablets, the active ingredient is for the most part mixed with ordinary tablet adjuvants such as corn starch, potato starch, talcum, magnesium stearate, gelatine, lactose, gums, or the like. A suitable formula for a tablet containing 25 mg. 9-gamma-dimethylaminopropylidene - 10,10 - dimethyl - 9,10 - dihydroanthracene (called N 7001 for short) in the form of its hydrochloride is as follows:

N 7001

|                      | Mg.  |
|----------------------|------|
| Hydrochloride        | 28   |
| Potato starch        | 36   |
| Lactose              | 18   |
| Gelatine             | 5    |
| Talcum               | 6    |
| Magnesium stearate   | 0.4  |

Any other pharmaceutical tabletting adjuvants may be used provided that they are compatible with the active ingredient.

The method according to the invention is illustrated by way of the following examples which are not to be construed as limiting.

EXAMPLE 1

*9-gamma-dimethylaminopropylidene-10,10-dimethyl-9,10-dihydroanthracene and its hydrochloride*

24 grams of 2-o-benzoylphenylpropanol-2 (M.P. 116 degrees centigrade) were dissolved in 250 ml. of anhydrous ether and the resulting solution was added dropwise while stirring to a suspension of 0.22 mol of dimethylaminopropylmagnesium chloride in 100 ml. of ether. The reaction mixture was refluxed for one hour on a steam bath, and water and dilute hydrochloric acid were added until the reaction was pH 4–5. The aqueous phase was separated and sixty milliliters of concentrated aqueous ammonia were added. The mixture was extracted with ether, and the ether phase was separated, dried and evaporated on a steam bath. The residue was dissolved in hot petroleum ether and the solution left standing to cool for some time, whereupon 4-dimethylamino-1-phenyl - 1 - [2 - (2 - hydroxy-2-propyl)phenyl]-butanol-1 crystallized out as white crystals which were sucked off. After drying they melted at 88–90 degrees centigrade.

Ten grams of this compound were cautiously dissolved in fifty milliliters of concentrated sulphuric acid under cooling and the mixture was kept at room temperature for 24 hours, whereupon the reaction mixture was poured into 200 grams of finely crushed ice, and concentrated aqueous ammonia was added to about pH 9, whereupon the oil which separated out was extracted with ether. The ether phase was separated, dried and the ether evaporated on a steam bath. The residue was dissolved in twenty milliliters of acetone and the solution neutralized with a solution of dry hydrogenchloride in ether. The white crystals of 9-gamma-dimethylaminopropylidene-10,10-dimethyl - 9,10 - dihydroanthracene hydrochloride which separated out was filtered off and dried. Yield nine grams. M.P. 245–247 degrees centigrade.

EXAMPLE 2

*3-chloro-9-gamma-dimethylaminopropylidene-10,10-dimethyl-9,10-dihydroanthracene and its hydrochloride*

When Example 1 is carried out using 27 grams of 2-[o-(p'-chlorobenzoyl)phenyl]-propanol-2 (M.P. 123–125 degrees centigrade) instead of 2-o-benzoylphenylpropanol-2, the hydrochloride of 9-gamma-dimethylaminopropylidene-3-chloro - 10,10 - dimethyl - 9,10 - dihydroanthracene is obtained as a white crystalline substance (M.P. 213–216 degrees centigrade).

EXAMPLE 3

*9-gamma-dimethylaminopropylidene-10,10-diethyl-9,10-dihydroanthracene and its hydrochloride*

When Example 1 is carried out using 28 grams of 3-o-benzoylphenylpentanol-3 instead of 2-o-benzoylphenylpropanol-2, the hydrochloride of 9-gamma-dimethylaminopropylidene-10,10-diethyl-9,10-dihydroanthracene is obtained. M.P. 176–179 degrees centigrade.

EXAMPLE 4

*Other 3-halo-9-gamma-dimethylaminopropylidene-10,10-dimethyl-9,10-dihydroanthracenes and salts thereof*

In the same manner as given in Examples 1 and 2, the compounds 3-bromo-9-gamma-dimethylaminopropylidene-10,10-dimethyl-9,10-dihydroanthracene and 3-fluoro-9 - gamma-dimethylaminopropylidene - 10,10 - dimethyl-9,10-dihydroanthracene are prepared, by respectively employing as starting materials, for reaction with the dimethylaminopropylmagnesium chloride, 2-[o-(p'-bromobenzoyl)phenyl]-propanol-2 and 2-[o-(p'-fluorobenzoyl)phenyl]-propanol-2. Their acid addition salts are produced and isolated in the manner of Example 1, using for example hydrochloric, hydrobromic, sulphuric, acetic, nitric, phosphoric, lactic, citric, tartaric, malonic, oxalic, methane or ethanesulphonic or like acids.

EXAMPLE 5

*Other 9,10-dihydroanthracenes and salts thereof*

In the same manner as given in Example 1, the compounds 9 - (gamma-N-piperidinylpropylidene)-10,10-dimethyl-9,10-dihydroanthracene (M.P. of the hydrochloride 266–269 degrees centigrade) and 9-[gamma-(N'-methyl - N - piperazino)-propylidene] - 10,10 - dimethyl-9,10-dihydroanthracene are prepared, by respectively employing as starting materials, for reaction with the 2-o-benzoylphenylpropanol-2, gamma-(1-piperidyl) - propylmagnesium chloride and gamma-(N'-methyl-N-piperazine)-propylmagnesium chloride. Their acid addition salts are produced and isolated in the manner of Example 1, using for example hydrochloric, hydrobromic, sulphuric, acetic, nitric, phosphoric, lactic, citric, tartaric, malonic, oxalic, methane or ethanesulphonic or like acids.

EXAMPLE 6

*Other acid addition salts*

In the same manner given in Example 1, other acid addition salts of the compounds of Examples 1 through 3 are prepared by employing other acids in place of the dry hydrogen chloride used in Example 1. For example, by employing hydrobromic, tartaric, malonic, oxalic, methane or ethanesulphonic or like acids, the corresponding acid addition salts of the free bases of Examples 1 through 3 are produced.

I claim:
1. A compound of the formula:

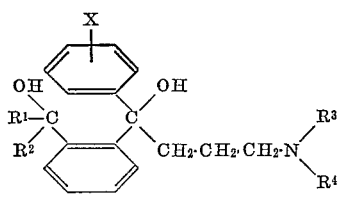

wherein $R^1$ and $R^2$ each represents a lower-alkyl group, wherein $R^3$ and $R^4$ taken together with the nitrogen atom represent a member of the group consisting of di-lower-alkylamino, pyrrolidino, piperidino, morpholino, thiamorpholino, and N'-lower-alkylpiperazino, and wherein X represents a member of the group consisting of hydrogen, chlorine, bromine, and fluorine.

2. 4-dimethylamino-1-phenyl-1-[2-(2-hydroxy-2-propyl)phenyl]-butanol-1.

No references cited.

CHARLES B. PARKER, *Primary Examiner*.